United States Patent
Eto et al.

(10) Patent No.: US 9,910,754 B2
(45) Date of Patent: Mar. 6, 2018

(54) DUPLEXED CONTROL SYSTEM AND CONTROL METHOD THEREOF

(71) Applicant: Kabushiki Kaisha Toshiba, Minato-ku (JP)

(72) Inventors: Yuma Eto, Kanagawa-ken (JP); Toshio Tagawa, Tokyo (JP); Tomokazu Imahori, Tokyo (JP); Susumu Yoshizawa, Tokyo (JP); Kazuo Ootani, Saitama-ken (JP); Yoshiyuki Nitta, Tokyo (JP); Kenichi Wakamatsu, Tokyo (JP); Yukio Okamoto, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 394 days.

(21) Appl. No.: 14/341,112

(22) Filed: Jul. 25, 2014

(65) Prior Publication Data
US 2014/0336794 A1 Nov. 13, 2014

Related U.S. Application Data

(63) Continuation of application No. PCT/JP2012/008147, filed on Dec. 20, 2012.

(30) Foreign Application Priority Data

Jan. 25, 2012 (JP) ................ 2012-013377

(51) Int. Cl.
*G05B 15/02* (2006.01)
*G06F 11/30* (2006.01)
*G06F 11/20* (2006.01)

(52) U.S. Cl.
CPC .......... *G06F 11/3027* (2013.01); *G05B 15/02* (2013.01); *G06F 11/2007* (2013.01); *G06F 11/2038* (2013.01); *G06F 11/2097* (2013.01)

(58) Field of Classification Search
CPC . G05B 15/02; G06F 11/2007; G06F 11/2038; G06F 11/2097; G06F 11/3027
(Continued)

(56) References Cited

U.S. PATENT DOCUMENTS 6,477,139 B1* 11/2002 Anderson ........... G06F 11/2007
370/216
2004/0001431 A1* 1/2004 Rostron .............. G06F 11/1489
370/216
(Continued)

FOREIGN PATENT DOCUMENTS

JP 7-200502 A 8/1995
JP 7-230301 A 8/1995
(Continued)

OTHER PUBLICATIONS

International Search Report dated Apr. 2, 2013 for PCT/JP2012/008147 filed on Dec. 20, 2012 with English Translation.
(Continued)

*Primary Examiner* — Yuhui R Pan
(74) *Attorney, Agent, or Firm* — Oblon, McClelland, Maier & Neustadt, L.L.P.

(57) ABSTRACT

A duplexed control system comprises: two control devices, whereof one is set to operate as a reserve system and the other is set to operate as a regular system; a tracking bus that connects the two control devices to enable these to exchange tracking signals; and a control transmission channel that transmits computational information of these two control devices; wherein: the control devices respectively have: an own-system state evaluation section that transmits the result of state evaluation of its own system as a tracking signal through the tracking bus to the other system; an other-system signal confirmation section that receives the tracking signal through the tracking bus from the control device of the other system and thus performs state confirmation; and a trans-
(Continued)

mission channel changeover section that, if the tracking signal cannot be received through the tracking bus, effects transmission of the tracking signal to the other-system signal confirmation section of the other system, through the control transmission channel.

8 Claims, 6 Drawing Sheets

(58) Field of Classification Search
USPC .......................................................... 700/81
See application file for complete search history.

(56) References Cited

U.S. PATENT DOCUMENTS

2006/0075085 A1* 4/2006 Borg .................. G06F 11/2028
709/224
2007/0288585 A1* 12/2007 Sekiguchi ........... G06F 11/2038
709/209
2008/0001734 A1* 1/2008 Stilp ....................... G05B 9/03
340/539.22

FOREIGN PATENT DOCUMENTS

| JP | 2001-356927 A | 12/2001 |
| JP | 2007-304687 A | 11/2007 |
| JP | 2009-80704 A | 4/2009 |
| JP | 2011-203941 A | 10/2011 |

OTHER PUBLICATIONS

International Written Opinion dated Apr. 2, 2013 for PCT/JP2012/008147 filed on Dec. 20, 2012.

* cited by examiner

DUPLEXED CONTROL SYSTEM AND CONTROL METHOD THEREOF

CROSS REFERENCE TO RELATED APPLICATION

This is a Continuation of PCT Application No. PCT/JP2012/008147, filed on Dec. 20, 2012, which is based upon and claims the benefit of priority from the prior Japanese Patent Application No. 2012-13377, filed on Jan. 25, 2012, the entire contents of which are incorporated herein by reference.

FIELD

The present invention relates to a duplexed control system (a duplicated control system or a dual control system) and control method thereof in which one control system operates as a reserve system and the other operates as the regular system.

BACKGROUND

A control system that is used to monitor and control a power plant such as an atomic power station (a nuclear power station or a nuclear power plant) is typically duplexed by being constructed as two control devices: one of these is operated as the regular system and the other is operated as a reserve system. In this duplexed control system, the two control devices are connected by an internal-only bus. These two control devices each perform state confirmation of the other, partner control device, by exchanging tracking signals indicating respectively active/inactive, fault information and computation results and/or time point information etc, using the internal-only bus as a tracking bus; synchronization is achieved by updating the calculation results and/or time point information.

In a duplexed control system, when abnormality occurs in the regular-system control device, a message reporting occurrence of abnormality is sent to the reserve-system control device through the internal-only bus, and operation is continued, changing over to employ the reserve system as the regular system. Techniques have been developed whereby, in such system changeover, the regular system/reserve system status is exchanged by the internal-only bus, and, by using a flip-flop circuit of the internal-only bus, either system is set as the regular system while the other is set as the reserve system, so that both systems can be prevented from becoming the regular system at the same time. Such a technique is described for example in Laid-open Japanese Patent Publication Number Tokkai H7-230301 (hereinafter referred to as Patent Reference 1). Also, the technique has been developed of organizing system changeover between the reserve system and regular system in a redundant fashion, by duplicating the system changeover section of the respective control devices of the duplexed control system, so that this is constituted by master and slave changeover sections. Such a technique is disclosed in for example Laid-open Japanese Patent Publication Number Tokkai 2001-356927 (hereinbelow referred to as Patent Reference 2).

PRIOR ART REFERENCES

Patent References

[Patent Reference 1] Laid-open Japanese Patent Publication Number Tokkai H7-230301

[Patent Reference 2] Laid-open Japanese Patent Publication Number Tokkai 2001-356927

In the case of the technique set out in Patent Reference 1 described above, there is provided a function whereby, if the control device is removed from the internal-only bus, or if abnormality occurs in the tracking bus due for example to disconnection in the internal-only bus, resulting in interruption of the tracking signal, the internal-only bus itself detects the disconnection of the tracking signal and notifies each control device thereof. By means of this function, the control devices of the duplexed control system can recognize that interruption of the tracking signal is not due to transmission abnormality of the control device of the other system, but rather due to abnormality of the tracking bus, and can thus continue operation.

However, when a duplexed control system is constituted using a conventional personal computer or controller in the control device, with conventional transmission means such as Ethernet (registered trademark) to connect the tracking bus, if a tracking signal interruption event occurs such as pulling out the connector of the tracking bus or disconnection of the tracking bus, the tracking bus itself is not equipped with a function of detecting such a signal interruption event.

Consequently, neither of these two control devices can identify whether such tracking signal interruption is due to abnormality of the control device of the other, partner system, or is due to abnormality of the tracking bus. As a result, the possibility arises that, even though the control devices of both systems are operating normally, they may mutually identify the other system as being abnormal, so that both systems shift into regular system mode: thus both control devices may attempt to control the same control target, resulting in erroneous operation. Also in the case of the technology disclosed in Patent Reference 2 described above, if an event occurs that cannot be tracked by both of the duplexed changeover sections, the same possibility of erroneous operation is present.

Accordingly, an object of the present invention is to provide a duplexed control system wherein each control device can detect abnormality of transmission on the tracking bus.

In order to achieve the above object, a duplexed control system according to the present invention has the following construction.

Specifically, the duplexed control system comprises:

two control devices, whereof one is set to operate as a reserve system and the other is set to operate as a regular system;

a tracking bus that connects the two control devices and that is capable of exchanging tracking signals between the two control devices; and a control transmission channel connected with the two control devices, that transmits computational information of the two control devices; characterized in that:

the two control devices respectively have:

an own-system state evaluation section that performs state evaluation of its own system and that transmits the result of this state evaluation as a tracking signal through the tracking bus to the control device of the other system;

an other-system signal confirmation section that receives the tracking signal through the tracking bus from the control device of the other system and thus performs state confirmation of the control device of the other system; and a transmission channel changeover section that, if a tracking signal cannot be received by this other-system signal confirmation section, causes its own-system state evaluation section to transmit a tracking signal to the other-system signal confirmation section of the other system, through the control transmission channel.

Further in order to achieve the above object, a duplexed control system control method according to the present invention comprises the following steps. Specifically, it is characterized in that it comprises:

a step of performing state evaluation of the own-system control device and transmitting the result of this state evaluation to the control device of the other system through the tracking bus as a tracking signal;

a step of receiving the tracking signal through the tracking bus from the control device of the other system, and thus performing state confirmation of the control device of the other system;

a step of, if the tracking signal cannot be received, causing its own-system state evaluation section to transmit a tracking signal to the other-system signal confirmation section of the other system, through a control transmission channel constituting a transmission channel for computational information of the two control devices.

With the present invention, each control device of the duplexed control system can detect transmission abnormality on the tracking bus.

DETAILED DESCRIPTION

Embodiments of the present invention are described below.

(First Embodiment)
(Construction)

Figure 1:
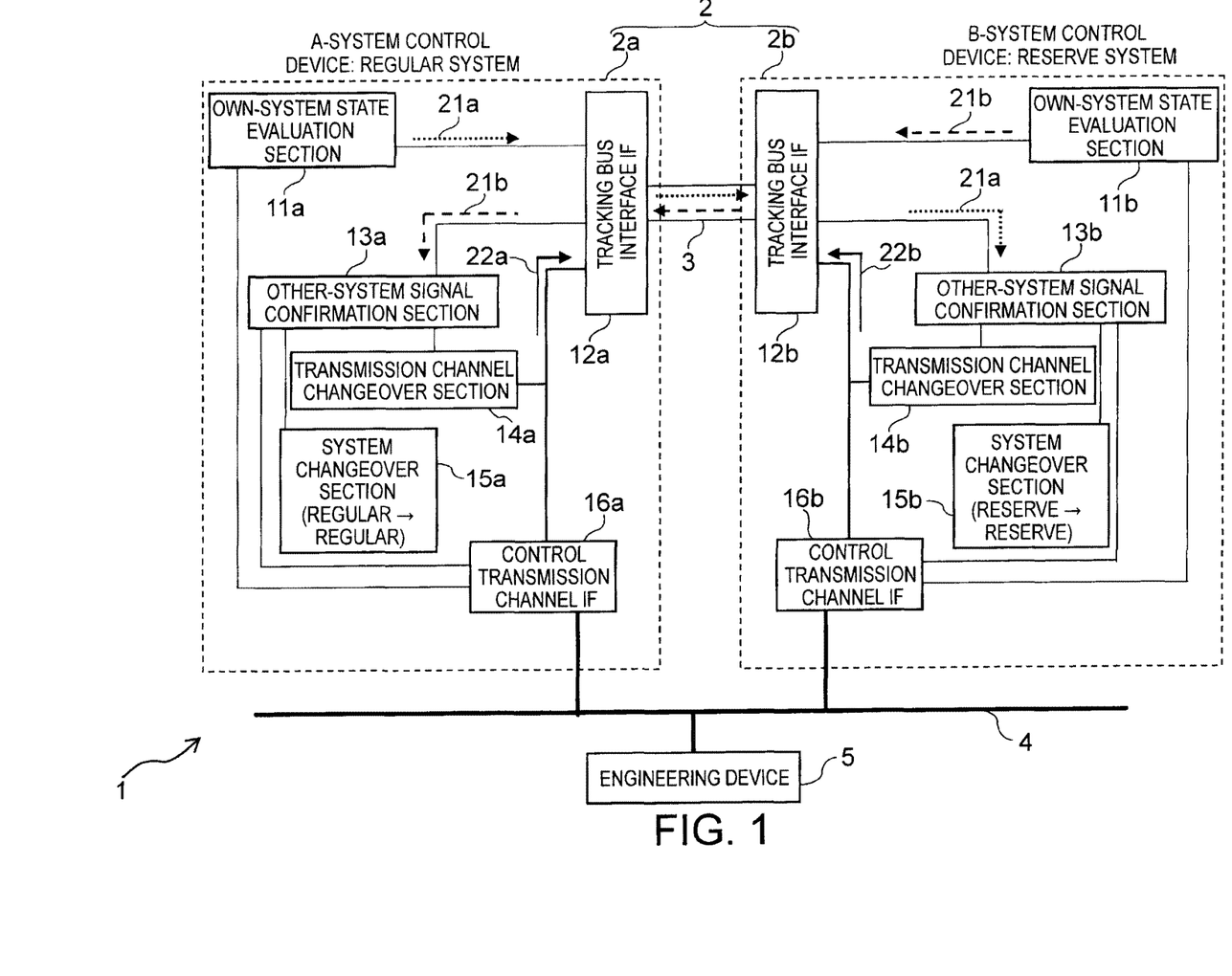
FIG. 1 is a layout diagram showing normal operation of the tracking bus of a duplexed control system according to a first embodiment of the present invention.

A duplexed control system according to a first embodiment of the present invention is described below with reference to FIG. 1 to FIG. 3. FIG. 1 is a layout diagram showing normal operation of the tracking bus of a duplexed control system according to a first embodiment of the present invention.

A duplexed control system 1 comprises a control device 2, a tracking bus 3, and a control transmission channel 4. The control device 2 comprises a system-A control device 2a and a system-B control device 2b. Also, an engineering device 5 is connected with the control transmission channel 4.

The system-A control device 2a and system-B control device 2b respectively comprise: own-system state evaluation sections 11a, 11b, tracking bus interfaces (IF's) 12a, 12b, other-system signal confirmation sections 13a, 13b, transmission channel changeover sections 14a, 14b, system changeover sections 15a, 15b, and control transmission channel interfaces (IF's) 16a, 16b.

The tracking bus IF 12a and tracking bus IF 12b are connected by the tracking bus 3. Conventional transmission means such as Ethernet (registered trademark), FireWire (registered trademark) or IEEE1394 may be employed for the tracking bus 3.

As shown in FIG. 1, own-system state evaluation sections 11a, 11b are connected so as to permit transmission of tracking signals 21a, 21b to the tracking bus IF's 12a, 12b. Other-system signal confirmation sections 13a, 13b are connected so as to permit reception of the other-system tracking signals 21a, 21b through the tracking bus IF's 12a, 12b. Transmission channel changeover sections 14a, 14b are connected so as to permit transmission of transmission instructions 22a, 22b to the tracking bus IF's 12a, 12b.

Figure 2:
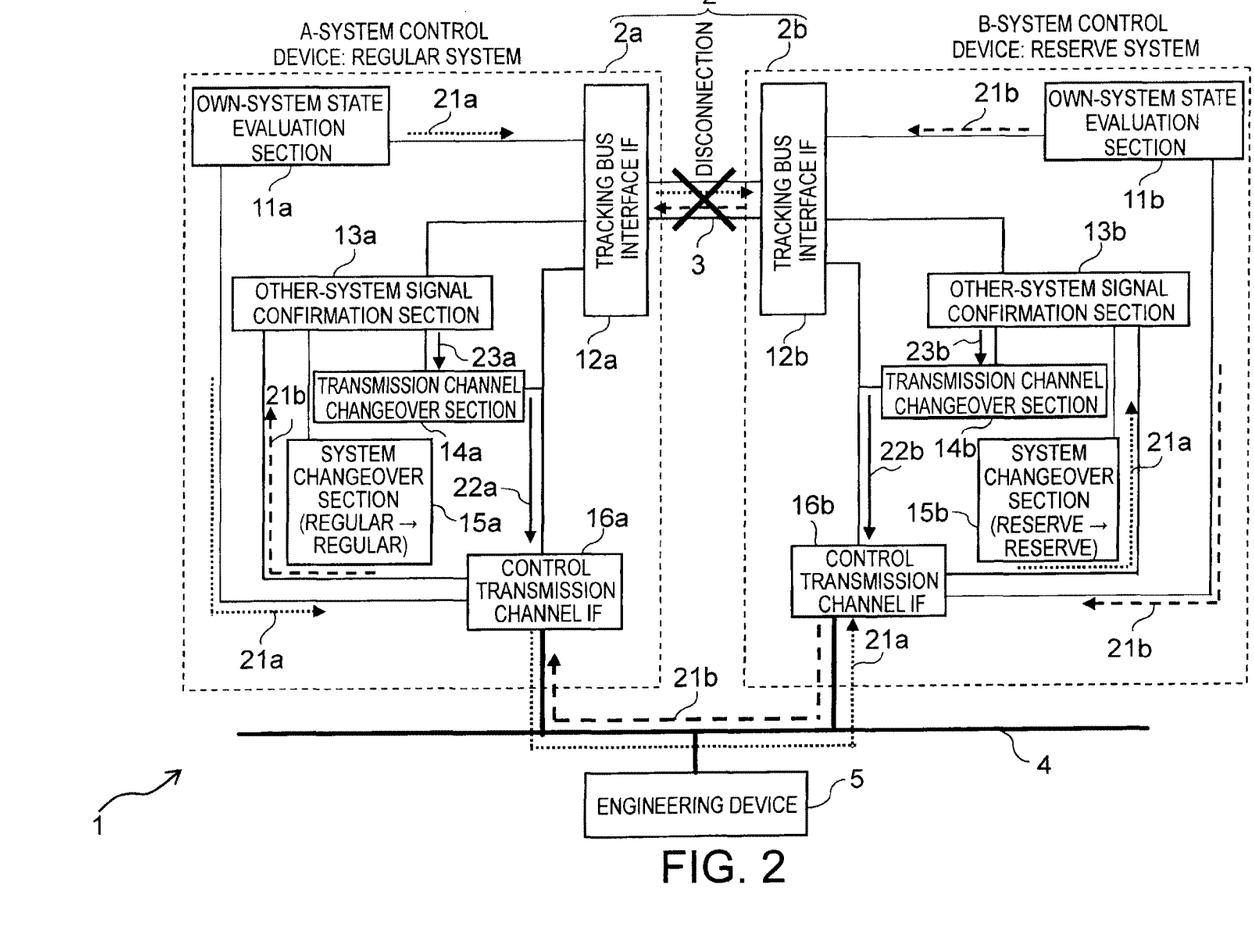
FIG. 2 is a layout diagram showing abnormal operation of the tracking bus of a duplexed control system according to a first embodiment of the present invention.
Figure 3:
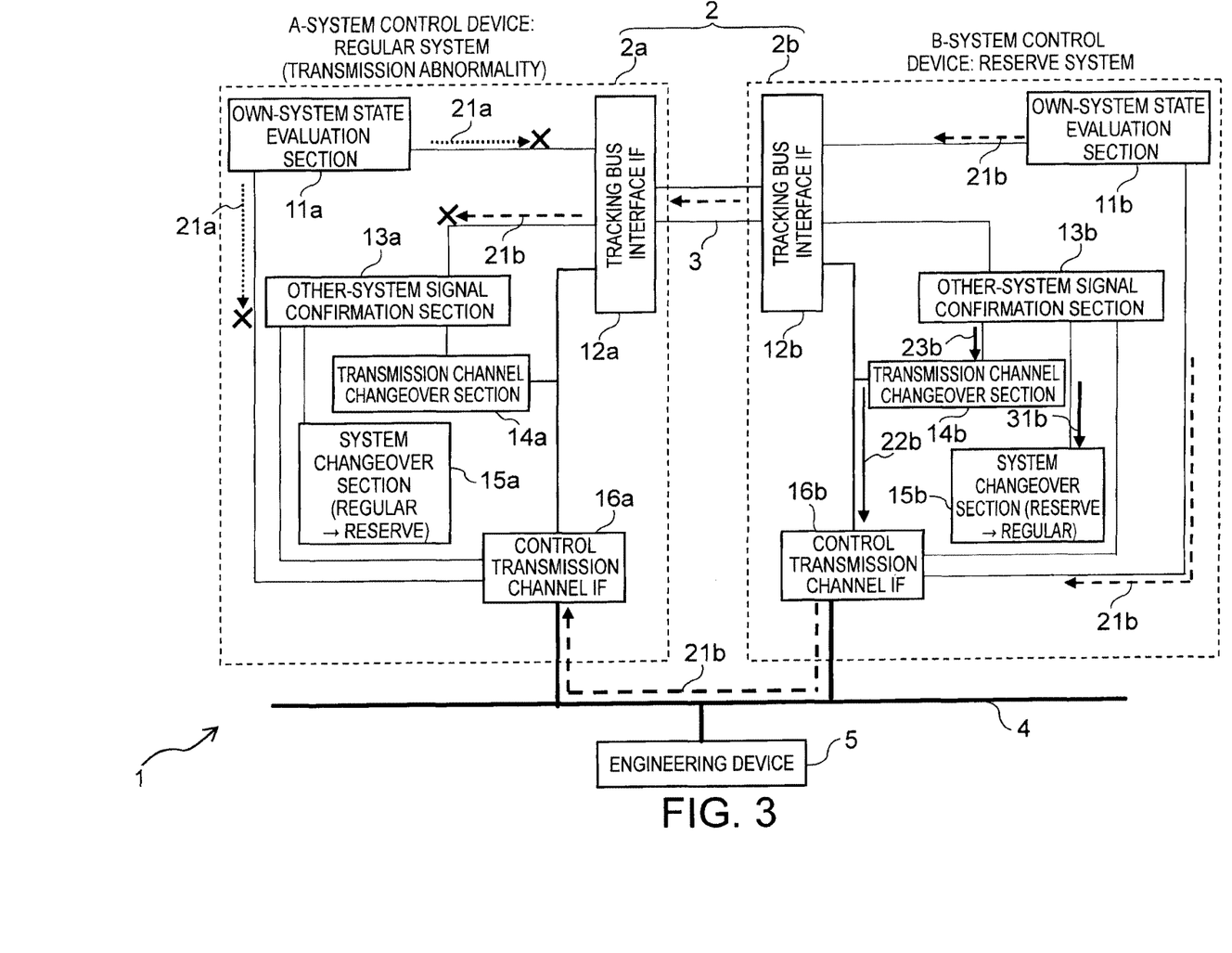
FIG. 3 is a layout diagram showing operation when the system-A control device of the duplexed control system of the first embodiment of the present invention is abnormal.

Furthermore, as shown in FIG. 2, own-system state evaluation sections 11a, 11b are connected so as to permit transmission of tracking signals 21a, 21b to control transmission channel IF's 16a, 16b. The other-system signal confirmation sections 13a, 13b are connected so as to permit reception from control transmission channel IF's 16a, 16b. The transmission channel changeover sections 14a, 14b are further connected so as to permit transmission of transmission instructions 22a, 22b to the control transmission channel IF's 16a, 16b. The system changeover sections 15a, 15b are connected so as to permit reception of system changeover instructions 31a, 31b from the other-system signal confirmation sections 13a, b.

The control transmission channel IF's 16a, 16b are connected to the control transmission channel 4. The engineering device 5 transmits instructions or input or the like relating to computation or control to the A-system control device 2a and B-system control device 2b, through the control transmission channel 4. The A-system control device 2a and B-system control device 2b perform computation or control in accordance with such instructions and, furthermore, can transmit the computation results through the control transmission channel 4 to another communication device connected with the control transmission channel 4 or the engineering device 5.

(Operation)

The operation of this first embodiment of the present invention will be described below. By way of example, the case where the A-system control device 2a operates as the regular system during ordinary operation and the B-system control device 2b operates as the reserve system will be described. The duplexed control system 1 performs system changeover between the regular system and the reserve system, while carrying out mutual state confirmation by performing tracking, in which tracking signals 21a, 21b are periodically transmitted and received between the A-system control device 2a and the B-system control device 2b.

First of all, operation in the case where signal transmission on the tracking bus 3 is normal and both control devices 2 are normal will be described. First of all, the transmission channel changeover sections 14a, 14b perform tracking using the tracking bus IF's 12a, 12b, transmitting respective transmission instructions 22a, 22b to the tracking bus IF's 12a, 12b.

The own-system state evaluation section 11a in the A-system control device 2a evaluates abnormality of the A-system control device 2a of its own system. This abnormality evaluation may be achieved using ordinary abnormality evaluation methods such as ascertaining the computation results of simulation computation, or input/output confirmation of a parity bit signal. If an evaluation is obtained that the state is normal, a tracking signal 21a indicating the normal state is transmitted as active-inactive/fault information to the tracking bus IF 12a. The tracking bus IF 12a transmits this tracking signal 21a through the tracking bus 3 to the tracking bus IF 12b.

The tracking bus IF 12b transmits a tracking signal 21a to the other-system signal confirmation section 13b in the B-system control device 2b. The other-system signal confirmation section 13b receives the tracking signal 21a and thereby performs state confirmation of the A-system control device 2a. At this point, the A-system control device 2a of the regular system is normal, so the system changeover section 15b maintains the reserve system as the reserve system, without performing system changeover.

In addition, synchronization can be effected by updating the computation results and/or time point information by transmitting to the other-system signal confirmation section 13b, as the tracking signal 21a, not merely active-inactive/fault information of the A-system control device 2a, but also the computation results and/or time point information of the A-system control device 2a.

The own-system state evaluation section 11b in the B-system control device 2b carries out abnormality evaluation of its own B-system control device 2b and transmission of a tracking signal 21b indicating the normal condition to the tracking bus IF 12a through the tracking bus IF 12b and tracking bus 3, in the same way as state confirmation of the A-system control device 2a. The other-system signal confirmation section 13a receives the tracking signal 21b from the tracking bus IF 12a and thereby performs state confirmation of the B-system control device 2b.

Also, if the A-system control device 2a has become abnormal, the own-system state evaluation section 11a transmits a tracking signal 21a indicating its own abnormality through the tracking bus 3 to the other-system signal confirmation section 13b in the B-system control device 2b. If the A-system control device 2a of the regular system is abnormal, it is necessary to continue operation by the B-system control device 2b acquiring the right of regular use. Accordingly, the other-system signal confirmation section 13b performs system changeover whereby the B-system control device 2b acquires the regular use right, by transmitting a system changeover instruction 31b as shown in FIG. 3 to the system changeover section 15b. Also, the A-system control device, based on the fact that its own-system state evaluation section 11a has identified abnormality, or based on the fact that information indicating acquisition of the regular use right by the B-system control device 2b has been acquired through the tracking bus 3, abandons its regular use right, and changes over to being the reserve system.

Next, operation will be described in the case where tracking abnormality i.e. a condition in which tracking cannot be performed by the tracking bus 3, because of signal transmission abnormality on the tracking bus 3, has been generated. Such tracking abnormality can be generated by abnormality of the tracking bus 3 or abnormality of the control device 2.

First of all, we shall describe operation when tracking abnormality has been generated by abnormality of the tracking bus 3. FIG. 2 is a layout diagram showing operation of the duplexed control system according to the first embodiment of the present invention in the event of abnormality of the tracking bus. Abnormality of the tracking bus 3 indicates a situation where normal transmission of the tracking signals 21a, 21b through the tracking bus 3 cannot be achieved, due to disconnection of the tracking bus 3 or removal of the connector from the tracking bus IF's 12a, 12b of the tracking bus 3, for example.

The other-system signal confirmation section 13b in the B-system control device 2b identifies tracking abnormality by confirming interruption of the tracking signal 21, which should be received periodically. At this point, the other-system signal confirmation section 13b transmits to the transmission channel changeover section 14b a transmission channel changeover instruction 23b, to cause changeover of tracking from the tracking bus IF 12b to the control transmission channel IF 16b. The transmission channel changeover section 14b transmits a transmission instruction 22a to the control transmission channel IF 16b, thereby enabling tracking to be performed using the control transmission channel IF 16b.

The control transmission channel IF 16b receives the tracking signal 21b from the own-system state evaluation section 11b and transmits the tracking signal 21b to the control transmission channel IF 16a through the control transmission channel 4. If the control transmission channel 4 is connected with some other communication equipment or the like, the tracking signal 21b can thus be transmitted to the control transmission channel IF 16a by appending to the tracking signal 21b the address or identification information of the partner system-A control device 2a.

The control transmission channel IF 16a transmits a tracking signal 21b to the other-system signal confirmation section 13a. The other-system signal confirmation section 13a performs state confirmation of the B-system control device 2b by receiving the tracking signal 21b. Furthermore, although the other-system signal confirmation section 13a cannot receive the tracking signal 21b through the tracking bus 3, it can identify occurrence of tracking abnormality by abnormality of the tracking bus 3, since the tracking signal 21b cannot be received through the control transmission channel 4.

Likewise, in the A-system control device 2a, the other-system signal confirmation section 13a identifies tracking abnormality by confirming that the tracking signal 21b, which ought to be periodically received, has been interrupted; and so causes tracking to be performed by changing over from the tracking bus IF 12a to the control transmission channel IF 16a, by sending a transmission channel changeover instruction 23a to the transmission channel changeover section 14a.

The control transmission channel IF 16a receives the tracking signal 21a from the own-system state evaluation section 11a and accordingly transmits the tracking signal 21a to the control transmission channel IF 16b through the control transmission channel 4. The other-system signal confirmation section 13b receives the tracking signal 21a from the control transmission channel IF 16b and is thereby able to perform state confirmation of the A-system control device 2a and to conclude that tracking abnormality has been produced by abnormality of the tracking bus 3.

Next, the operation when the tracking abnormality is due to abnormality of the control device 2 will be described, taking as a typical example the case where the A-system control device 2a is abnormal. FIG. 3 is a layout diagram showing the operation according to the first embodiment of the present invention in the case where the A-system control device of the duplexed control system is abnormal. In this case, the abnormality of the A-system control device 2a that causes the tracking abnormality is the condition that, due to power loss or a serious malfunction or the like, the own-system state evaluation section 11*a* is unable to transmit a tracking signal 21*a*.

The other-system signal confirmation section 13*b* in the B-system control device 2*b* identifies tracking abnormality by confirming interruption of the tracking signal 21*a*, which should be periodically received. The other-system signal confirmation section 13*b* transmits a transmission channel changeover instruction 23*b* to change over tracking from the tracking bus IF 12*b* to the control transmission channel IF 16*b;* the transmission channel changeover section 14*b* transmits a transmission instruction 22*a* to the control transmission channel IF 16*b;* in this way, it is arranged for tracking to be performed using the control transmission channel IF 16*b*. The control transmission channel IF 16*b* receives the tracking signal 21*b* from the own-system state evaluation section 11*b*, transmits the tracking signal 21*b* to 16*a* through the control transmission channel 4, and periodically tries to receive the tracking signal 21*a* from the A-system control device 2*a*.

In this condition, the A-system control device 2*a* is abnormal and so cannot transmit the tracking signal 21*a*, so the periodic attempts by the other-system signal confirmation section 13*b* to receive the tracking signal 21*a* are unsuccessful. Based on this fact that the periodic attempts to receive the tracking signal 21*a* through the control transmission channel 4 are unsuccessful, the other-system signal confirmation section 13*b* therefore concludes that the tracking abnormality has been generated due to abnormality of the A-system control device 2*a*.

Furthermore, since this abnormal A-system control device 2*a* is currently set as the regular system, it becomes necessary to set the B-system control device 2*b* as the regular system. The other-system signal confirmation section 13*b* therefore transmits a system changeover instruction 31*b* to the system changeover section 15*b* to cause the regular use right to be acquired: the system changeover section 15*b* consequently effects this changeover from reserve system to regular system. Also, if the A-system control device 2*a* is capable of recognizing its own abnormality, its system changeover section 15*a* may perform system changeover from regular system to reserve system.

(Beneficial Effect)

With the first embodiment of the present invention, during normal operation, tracking is performed using the tracking bus 3 and if there is tracking abnormality of the tracking bus 3, tracking is performed through the control transmission channel 4: consequently, each control device 2 is able to perform state confirmation of the tracking bus 3 and also the other-system control device 2. As a result, in the event of tracking abnormality on the tracking bus 3, it is possible to prevent abnormal operation in which both systems of the control device 2 are put into regular use condition or both systems are put into reserve use condition.

(Second Embodiment)
(Construction)

A duplexed control system according to a second embodiment of the present invention will be described below with reference to FIG. 4. Portions of the duplexed control system that are the same as those of the system according to the first embodiment are given the same reference symbols, to avoid repeated description.

Figure 4:
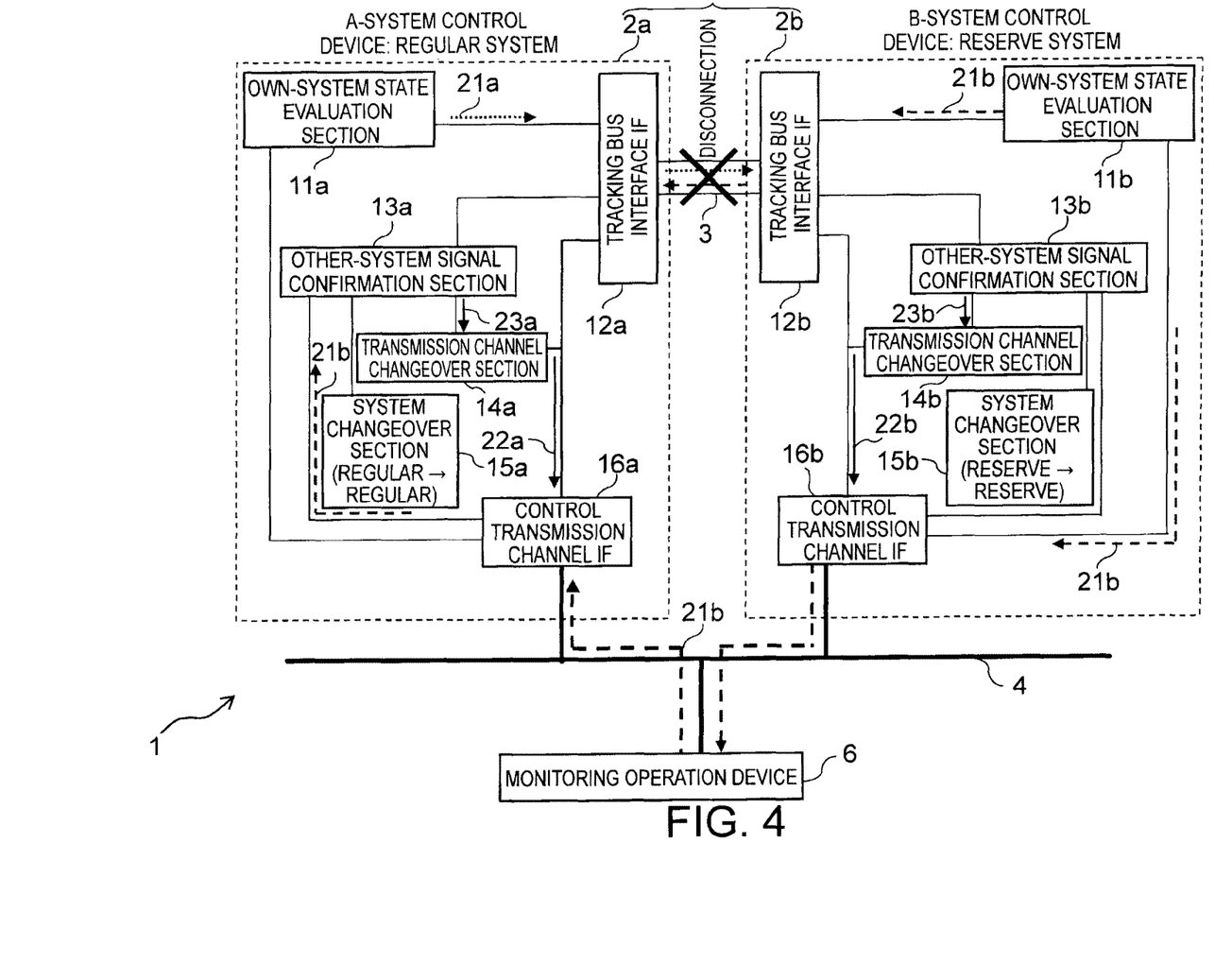
FIG. 4 is a layout diagram showing operation when the tracking bus of the duplexed control system of the second embodiment of the present invention is abnormal.

FIG. 4 is a layout diagram showing operation when the tracking bus of the duplexed control system of the second embodiment of the present invention is abnormal. The distinction between the second embodiment and the first embodiment lies in the further provision of a monitoring operation device 6. This monitoring operation device 6 is connected with the control transmission channel 4 so as to be capable of receiving tracking signals 21*a*, 21*b* from the A-system control device 2*a* and the B-system control device 2*b* through the control transmission channel 4.

(Operation)

The operation of this second embodiment of the present invention will be described below. Hereinafter there is described by way of example the case where the tracking signal 21*b* is transmitted from the B-system control device 2B to the A-system control device 2*a* through the monitoring operation device 6. When the A-system control device 2*a* identifies tracking abnormality as described above, it transmits a tracking signal 21*b* to the monitoring operation device 6 through the control transmission channel 4. On receiving this tracking signal 21*b*, the monitoring operation device 6 further transmits this, with a prescribed timing, to the A-system control device 2*a*.

In addition, the monitoring operation device 6 may be made to monitor the load on the control transmission channel 4 and to transmit a tracking signal 21*b* when the load on the control transmission channel 4 is low, or to transmit the tracking signal 21*b* a plurality of times. In this case, a tracking signal 21*b* can be acquired from the monitoring operation device 6 even when the tracking signal 21*b* cannot be transmitted from the B-system control device 2*b* to the A-system control device 2*a*, due to a temporary high load condition of the control transmission channel 4, or due to packet loss.

(Beneficial Effect)

With this second embodiment of the present invention, state confirmation of the control device 2 of the other system and the tracking bus 3 of each of the control devices 2 can be even more reliably performed by performing tracking through the monitoring operation device 6, in addition to tracking between the control devices 2 performed using the tracking bus 3 and the control transmission channel 4.

(Third Embodiment)
(Construction)

A duplexed control system according to a third embodiment of the present invention will be described below with reference to FIG. 5. Portions of the duplexed control system that are the same as those of the system according to the first embodiment are given the same reference symbols, to avoid repeated description.

Figure 5:
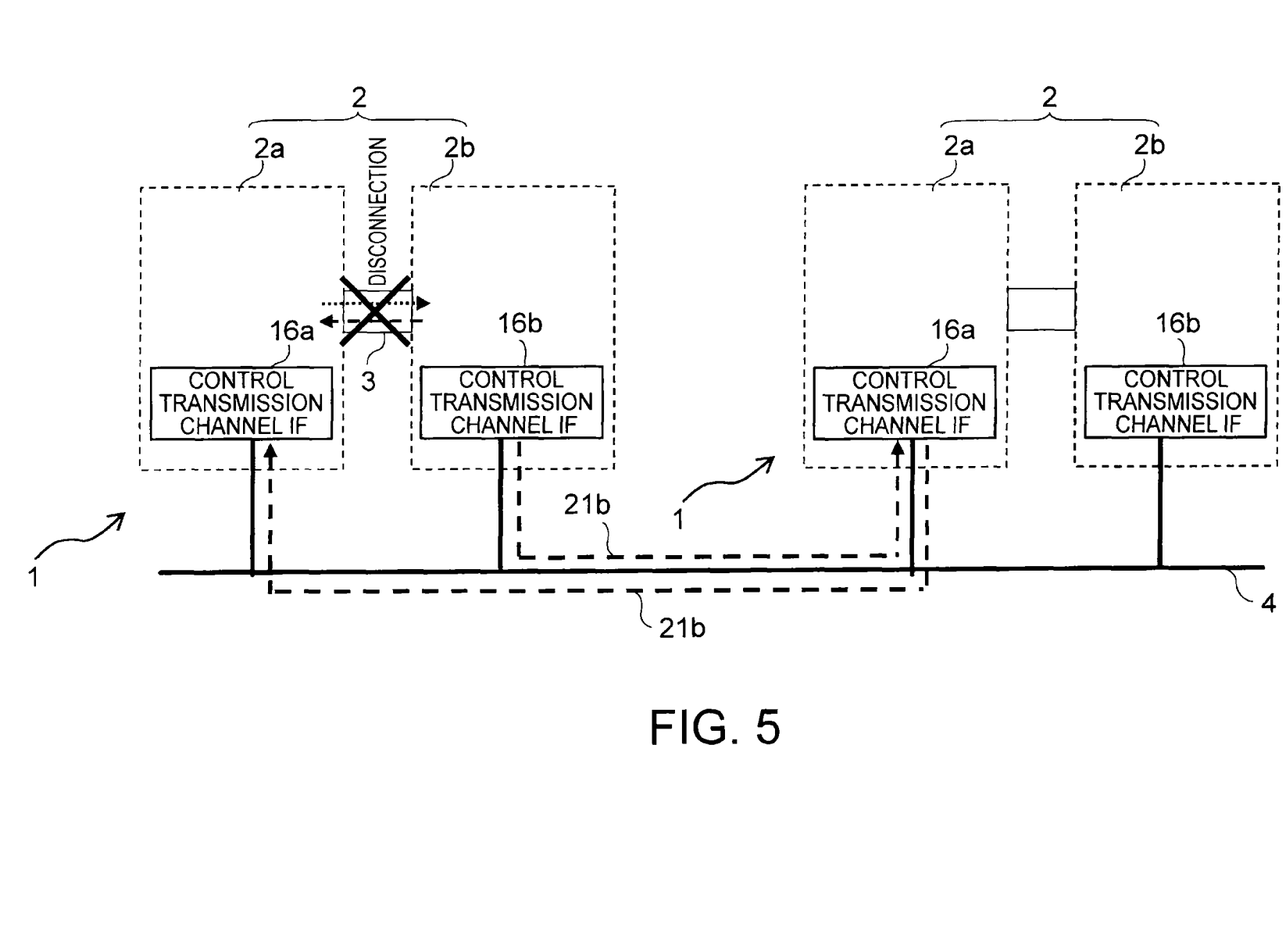
FIG. 5 is a layout diagram showing operation when the tracking bus of the duplexed control system of the third embodiment of the present invention is abnormal.

FIG. 5 is a layout diagram showing the operation of a duplexed control system according to a third embodiment of the present invention when the tracking bus is abnormal. The distinction between the third embodiment and the first embodiment is that a plurality of duplexed control systems 1 are provided. Respective control transmission channel IF's 16*a*, 16*b* of the plurality of duplexed control systems 1 are connected with the control transmission channel 4.

(Operation)

The operation of this third embodiment of the present invention will be described below. When tracking abnormality is generated in one of the plurality of duplexed control systems 1, the control transmission channel IF 16*b* in this duplexed control system 1 transmits a tracking signal 21*b* to the control transmission channel IF 16*b* of the other duplexed control system 1. When this happens, the other duplexed control system 1, on identifying tracking abnormality of the duplexed control system 1 that is the source of transmission of the tracking signal 21*b*, transmits a tracking signal 21*b* to the control transmission channel IF 16*a* of this duplexed control system 1 that was the source of the aforementioned transmission. In addition, this other duplexed control system 1 may hold the tracking signal 21 that it has thus received and transmit the tracking signal 21 during low-load conditions of the control transmission channel 4.

(Beneficial Effect)

With this third embodiment of the present invention, by performing tracking between a plurality of duplexed control system is 1, in addition to the tracking within a single duplexed control system 1, each of the control devices 2 can perform state confirmation of the other-system control device 2 and the tracking bus even more reliably.

(Fourth Embodiment)
(Construction)

A duplexed control system according to a fourth embodiment of the present invention will be described below with reference to FIG. 6. Portions of the duplexed control system that are the same as those of the system according to the first embodiment are given the same reference symbols, to avoid repeated description.

Figure 6:
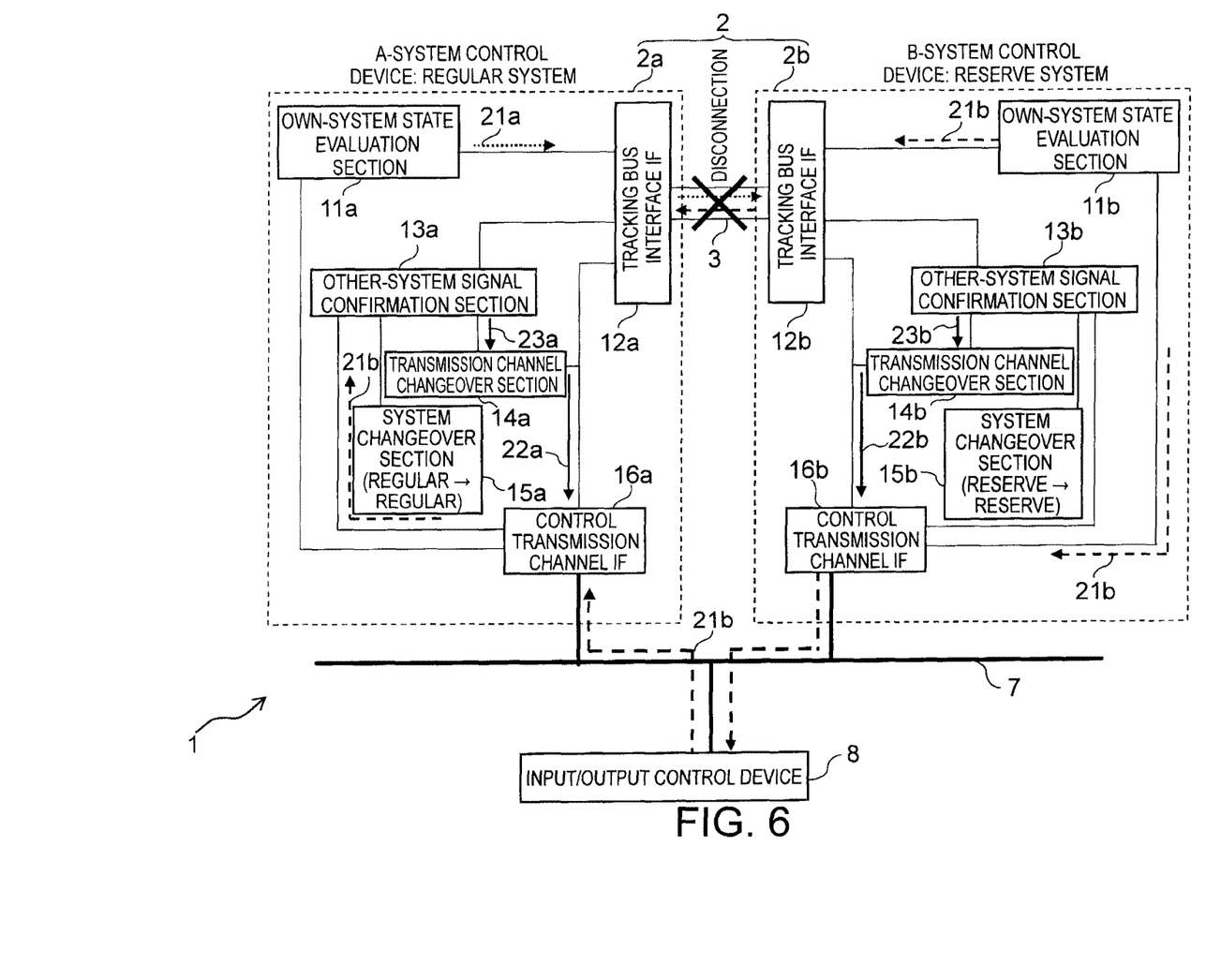
FIG. 6 is a layout diagram showing operation when the tracking bus of the duplexed control system of the fourth embodiment of the present invention is abnormal.

FIG. 6 is a layout diagram showing operation when the tracking bus of the duplexed control system of the fourth embodiment of the present invention is abnormal. The distinction of the fourth embodiment from the first embodiment is that the control device 2, instead of the control transmission channel 4, is further provided with an input/output (IO) network 7 and an input/output control device 8. The control transmission channel IF's 16a, 16b are respectively connected with the IO network 7. Also, the input/output control device 8 is connected with the IO network 7. The IO network 7 is a network providing a transmission channel chiefly for computation results of the control device 2 and/or instructions from the control device 2 to plant equipment.

(Operation)

The operation of the fourth embodiment of the present invention will be described below. When tracking abnormality is generated, the duplexed control system 1 transmits tracking signals 21a, 21b through the IO network 7. In addition, it can transmit tracking signals 21a, 21b to the input/output control device 8 and can cause tracking signals 21a, 21b to be transmitted from the input/output control device 8 with prescribed timing. The A-system control device 2a and B-system control device 2b perform other-system state confirmation by receiving tracking signals 21a, 21b through the IO network 7.

The control transmission channel 4 and IO network 7 may also be connected to the control transmission channel IF's 16a, 16b. In this case, they can exchange tracking signals 21a, 21b through the control transmission channel 4 or IO network 7.

(Beneficial Effect)

With the fourth embodiment of the present invention, in addition to the control system transmission channel 4, tracking signals 21a, 21b can be exchanged through the IO network 8, so even more reliable state confirmation of the A-system control device 2a and B-system control device 2b can be achieved.

It should be noted that embodiments of the present invention are of course not restricted to the embodiments described above. For example, the details of computation or details of control by the control device 2 may be suitably modified depending on the application of the duplexed control system 1 or the type of plant in which the duplexed control system 1 is provided. Also, the first to the fourth embodiments described above may be suitably combined.

FIELD OF INDUSTRIAL APPLICATION

The present invention may be employed in for example a power plant control system where critical control is required, a chemical plant control system, or an iron/steelworks plant control system.

What is claimed is:

1. A duplexed control system comprising:
two control devices, whereof one is set to operate as a reserve system and the other is set to operate as a regular system;
a tracking bus implementing a tracking signal transmission channel that connects said two control devices and that is capable of exchanging tracking signals between said two control devices; and
a control transmission channel connected with said two control devices, that transmits computational information of said two control devices,
wherein said two control devices respectively include:
an own-system state evaluation section that performs state evaluation of its own system and that transmits a result of said state evaluation as a tracking signal through said tracking bus to said control device of the other system;
an other-system signal confirmation section that receives said tracking signal through said tracking bus from said control device of said other system and thus performs state confirmation of said control device of said other system;
a transmission channel changeover section that, if said tracking signal cannot be received by said other-system signal confirmation section through said tracking bus, causes said own-system state evaluation section to transmit said tracking signal to said other-system signal confirmation section of said other system, through said control transmission channel, and
a monitoring operation device provided on the control transmission channel, the monitoring operation device receiving and holding the tracking signal in response to the other-system signal confirmation section not receiving the tracking signal through the tracking bus, wherein
in response to the other-system signal confirmation section not receiving the tracking signal through the tracking bus, the own-system state evaluation section transmits the tracking signal to the monitoring operation device through the control transmission channel and the other-system signal confirmation section receives the tracking signal from the monitoring operation device.

2. The duplexed control system according to claim 1, wherein, when said tracking signal transmission channel has been changed over to said control transmission channel by the transmission channel changeover section, if a reserve system control device does not receive said tracking signal through said control transmission channel, said reserve system control device performs system changeover by acquiring a regular use right.

3. The duplexed control system according to claim 1, wherein, when said tracking signal transmission channel has been changed over to said control transmission channel by said transmission channel changeover section, if said reserve system control device has received, from said control device of the regular system, through said control transmission channel, said tracking signal indicating abnormality, said reserve system control device performs system changeover by acquiring a regular use right.

4. The duplexed control system according to claim 1, further comprising a plurality of duplexed control systems,
   wherein, if said other-system signal confirmation section cannot receive said tracking signal through said tracking bus, a tracking signal can be transmitted to and received by another said duplexed control system, from one of said plurality of duplexed control systems.

5. The duplexed control system according to claim 1, further comprising
   an input/output network capable of transmitting computation results of said control devices,
   wherein, if said other-system signal confirmation section cannot receive said tracking signal through said tracking bus, said tracking signal is transmitted to said other-system signal confirmation section of another system through said input/output network.

6. The duplexed control system according to claim 2, further comprising
   an input/output network capable of transmitting computation results of said control devices,
   wherein, if said other-system signal confirmation section cannot receive said tracking signal through said tracking bus, said tracking signal is transmitted to said other-system signal confirmation section of another system through said input/output network.

7. The duplexed control system according to claim 3, further comprising
   an input/output network capable of transmitting computation results of said control devices,
   wherein, if said other-system signal confirmation section cannot receive said tracking signal through said tracking bus, said tracking signal is transmitted to said other-system signal confirmation section of another system through said input/output network.

8. A duplexed control system control method comprising:
   performing state evaluation of an own-system control device and transmitting a result of the state evaluation to a control device of another system through a tracking bus as a tracking signal;
   receiving said tracking signal through said tracking bus from said control device of said other system, and thus performing state confirmation of said control device of said other system;
   on identifying interruption of said tracking signal, causing said own-system control device to transmit said tracking signal to said control device of the other system through a control transmission channel, which is a transmission channel for computational information of said two control devices;
   in response to the own-system control device not receiving the tracking signal through the tracking bus, receiving and holding the tracking signal in a monitoring operation device; and
   in response to the own-system control device not receiving the tracking signal through the tracking bus, transmitting, by the own-system control device, the tracking signal to the monitoring operation device through the control transmission channel and receiving, by the own-system control device, the tracking signal from the monitoring operation device.

* * * * *